United States Patent
Sussek

(10) Patent No.: US 9,260,099 B2
(45) Date of Patent: Feb. 16, 2016

(54) METHOD FOR ADJUSTING A PARKING BRAKE IN A VEHICLE

(71) Applicant: Ulrich Sussek, Oberstenfeld (DE)

(72) Inventor: Ulrich Sussek, Oberstenfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/394,670

(22) PCT Filed: Feb. 19, 2013

(86) PCT No.: PCT/EP2013/053235
§ 371 (c)(1),
(2) Date: Oct. 15, 2014

(87) PCT Pub. No.: WO2013/156176
PCT Pub. Date: Oct. 24, 2013

(65) Prior Publication Data
US 2015/0100215 A1    Apr. 9, 2015

(30) Foreign Application Priority Data
Apr. 16, 2012    (DE) .......................... 10 2012 206 226

(51) Int. Cl.
*B60T 13/74*    (2006.01)
*B60T 13/66*    (2006.01)
*F16D 65/14*    (2006.01)
*F16D 121/24*    (2012.01)

(52) U.S. Cl.
CPC ............ *B60T 13/662* (2013.01); *B60T 13/741* (2013.01); *F16D 65/14* (2013.01); *F16D 2121/24* (2013.01)

(58) Field of Classification Search
CPC ..... B60T 13/662; B60T 13/741; F16D 65/14; F16D 2121/24
See application file for complete search history.

(56) References Cited

U.S. PATENT DOCUMENTS

| | | | |
|---|---|---|---|
| 2007/0084682 A1* | 4/2007 | Griffith et al. | 188/156 |
| 2008/0180059 A1* | 7/2008 | Carrier et al. | 320/112 |
| 2008/0283345 A1* | 11/2008 | Balz et al. | 188/72.6 |
| 2010/0026224 A1* | 2/2010 | Kollner et al. | 318/432 |
| 2011/0285453 A1* | 11/2011 | Kuttner | 327/427 |
| 2011/0295478 A1* | 12/2011 | Jeon | 701/70 |
| 2012/0022733 A1* | 1/2012 | Vaz et al. | 701/22 |

FOREIGN PATENT DOCUMENTS

| | | | | |
|---|---|---|---|---|
| DE | 10 2006 052810 | | 5/2008 | |
| DE | 102008034645 A1 * | | 1/2010 | ............. B60T 17/22 |
| DE | 102008037809 A1 * | | 2/2010 | ............. B60T 13/74 |
| DE | 10 2009 001258 | | 9/2010 | |

OTHER PUBLICATIONS

International Search Report for PCT/EP2013/053235, dated Aug. 19, 2013.

* cited by examiner

*Primary Examiner* — Rodney Butler
(74) *Attorney, Agent, or Firm* — Kenyon & Kenyon LLP

(57) ABSTRACT

In a method for adjusting the clamping force which is exerted by a parking brake and is generated by an electric brake motor, in the event of a jump in the voltage or the current of the electric brake motor, a correction current is ascertained on which the calculation of the motor parameters is based.

10 Claims, 1 Drawing Sheet

METHOD FOR ADJUSTING A PARKING BRAKE IN A VEHICLE

BACKGROUND OF THE INVENTION

1. Field of the Invention

The present invention relates to a method for adjusting a parking brake in a vehicle.

2. Description of the Related Art

A method for estimating the clamping force generated by an electric brake motor in a parking brake of a motor vehicle is known from published German patent application document DE 10 2006 052 810 A1. When actuating the electric brake motor, a brake piston, which carries the brake pad, is pressed axially against a brake disk. The clamping force is determined on the basis of a differential equation system, taking into account the current, the supply voltage of the brake motor and the engine speed, which reflects the electrical and mechanical behavior of the brake motor.

The brake motor, like a number of other electrical consumers, is supplied with current via the on-board power supply in the motor vehicle. If, after the electric brake motor is started, another consumer is connected, this causes a voltage drop and a drop in power in the brake motor, which may result in a false value of the clamping force to be ascertained.

BRIEF SUMMARY OF THE INVENTION

The object of the present invention is to determine with great accuracy the clamping force generated by a parking brake via an electric brake motor using simple measures, also for the event that additional consumers are connected to or disconnected from the on-board power supply during an actuation of the brake motor.

The method for determining the clamping force may be used in conjunction with electromechanical parking brakes in motor vehicles, which include an electric brake motor, upon actuation of which the clamping force is generated. In this arrangement, the rotational movement of the rotor of the electric brake motor is translated into an axial actuation of a shaft by way of which a brake piston which carries a brake pad is pressed axially against a brake disk.

The parking brake in the vehicle may, if necessary, be equipped with an auxiliary brake device in order to provide an additional clamping force if needed, in addition to the electromechanical clamping force. The auxiliary brake device is preferably the hydraulic vehicle brake of the vehicle, the hydraulic pressure of which acts on the brake piston.

In order to ascertain the instantaneously acting clamping force generated by the electric brake motor, knowledge of the instantaneous motor current is required, on the basis of which the motor load torque and hence the clamping force may be calculated and taking as a basis a gear reduction ratio and the efficiency factor. The current and the voltage in the electric brake motor are generally sufficient as measured variables.

After the electric brake motor is switched on, the motor current, braked only by the armature inductance, increases sharply initially, only to then drop again as a result of the initiated armature rotation. Due to its high dynamic, the switch-on surge current may be used to estimate the electric motor parameters $R_M$ (motor resistance) and $K_M$ (motor constant). Measured values for the calculation of the motor parameters and, as a function thereof, the clamping force, are ascertained in the dropping branch of the current following the current peak.

If in this phase another electrical consumer which, like the electric brake motor, is connected to the on-board power supply of the motor vehicle, is connected or disconnected, the result is a falsification of the voltage curve and current curve, each of which almost abruptly switches to a lower or higher value. If, for example, an electrical consumer is connected, both the voltage curve and the current curve of the electric brake motor drop almost suddenly. If, after the jump, the motor parameters are determined based on the current values and voltage values, this leads to a false calculation of the clamping force.

In order to also be able to determine with sufficient accuracy the clamping force when connecting or disconnecting another electrical consumer, and in the event of a jump in the voltage or current of the electric brake motor, a correction current which compensates for the jump is ascertained, on the basis of which the motor parameters of the brake motor are calculated for ascertaining the clamping force. The correction current follows at least approximately the original curve of the motor current with no other electrical consumer being connected or disconnected.

Since each connection or disconnection of a consumer may be seen as a repeated switching operation, which is superimposed on the original connection operation of the electric brake motor, the current curve may be inherently compensated for by advantageously determining a suitable scaling factor which may be used to correct the current curve after the jump has occurred. After the jump, the current curve is advantageously raised or lowered by one correction term, which is ascertained by multiplying the scaling factor by a current value present before the jump. In this case, the idle current of the brake motor, which is captured load-free and stable after the switch-on surge current, may also be subtracted from the original current value.

The current value after the jump is corrected by addition or subtraction of the correction term, depending on the jump direction. If an additional electrical consumer is connected, the current value drops. Accordingly, after the drop in current the current curve must be raised again via the correction term. Conversely, the current curve rises if a previously connected electrical consumer is disconnected during actuation of the electric brake motor; in such case the current curve must be lowered via the correction term after the jump has occurred.

The correction depends essentially on the scaling factor, which may be advantageously determined from the curve of the voltage which is present at the brake motor. The scaling factor depends on the voltage jump, which occurs in the motor voltage when the additional electrical consumer is connected or disconnected. The scaling factor is advantageously ascertained based on the relationship between the voltage jump and the difference between the voltage value present before the jump and a voltage constant. The voltage constant in this case is advantageously significantly lower than the operating voltage and is present, for example, at a value of 0.5 V. Once the scaling factor is ascertained, the correction current after the jump may be calculated as described above and, based on that, the motor parameters on which the calculation of the clamping force is based.

As an alternative to a predefined value, the voltage constant $U_{const}$ may also be recursively calculated as a product based on motor resistance $R_M$ and idle current $i_L$. In the first pass, a given start value is used for motor resistance $R_M$, which is subsequently replaced by improved values. After multiple, recursive calculation steps, the improved value for the voltage constant is obtained, and with that, a better result for motor resistance $R_M$ and motor constant $K_M$.

In principle, multiple corrected current values may be calculated by multiplying current values by the scaling factor at different points in time before the jump, in order to obtain on this basis the desired correction term, which before the jump is added to or subtracted from another current value. This makes it possible to estimate the continuous curve in the current as if no jump had occurred.

The method according to the present invention runs in a regulating or control device in the vehicle, which is advantageously a component of the parking brake system.

DETAILED DESCRIPTION OF THE INVENTION

Figure 1:
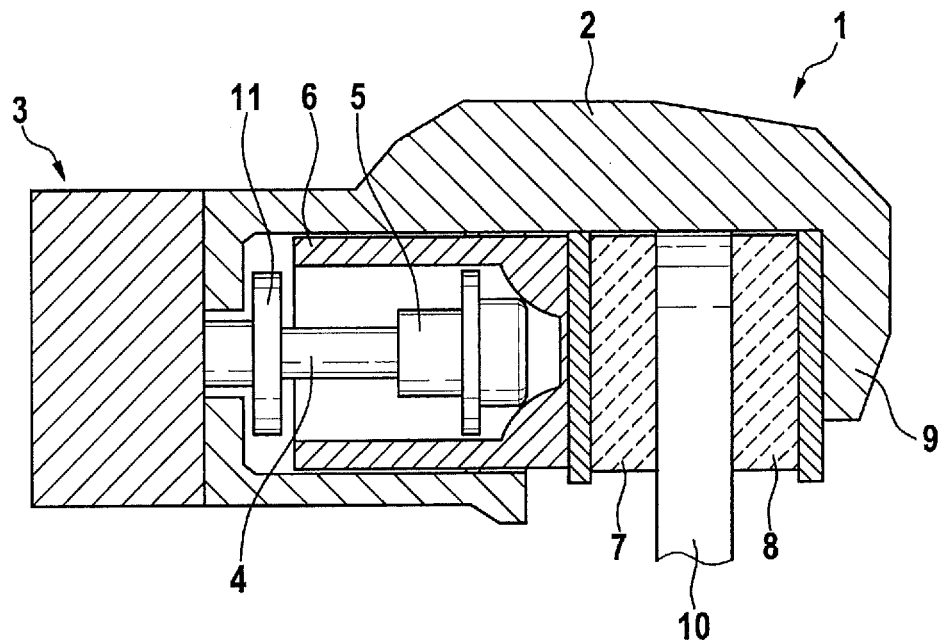
FIG. 1 shows a section through an electromechanical parking brake for a vehicle, in which the clamping force is generated via an electric brake motor.

FIG. 1 depicts an electromechanical parking brake 1 for keeping a vehicle at a standstill. Parking brake 1 includes a caliper assembly 2 having a brake caliper 9, which overlaps a brake disk 10. Parking brake 1 includes as an actuator an electric motor in the form of brake motor 3, which rotatingly drives a shaft 4, on which a shaft component 5 implemented as a spindle nut is rotationally supported. Shaft component 5 is adjusted axially when shaft 4 rotates. Shaft component 5 moves within a brake piston 6, which carries a brake pad 7, which is pressed against brake disk 10 by brake piston 6. Situated on the opposite side of brake disk 10 is another brake pad 8, which is held stationary on the brake caliper 9.

Shaft component 5 is able to move within brake piston 6 when shaft 4 rotates axially forward in the direction of brake disk 10, or when shaft 4 rotates in an opposite direction axially to the rear until it reaches a stop 11. To generate a clamping force, shaft component 5 acts on the inner front face of brake piston 6, as a result of which brake piston 6 mounted for axial displacement in parking brake 1 is pressed with brake pad 7 against the abutting face of brake disk 10.

The parking brake may be assisted by a hydraulic vehicle brake if necessary, so that the clamping force is composed of an electromotive component and a hydraulic component. Under hydraulic assistance, the rear side of brake piston 6 facing the brake motor is acted upon by a pressurized hydraulic fluid.

Figure 2:
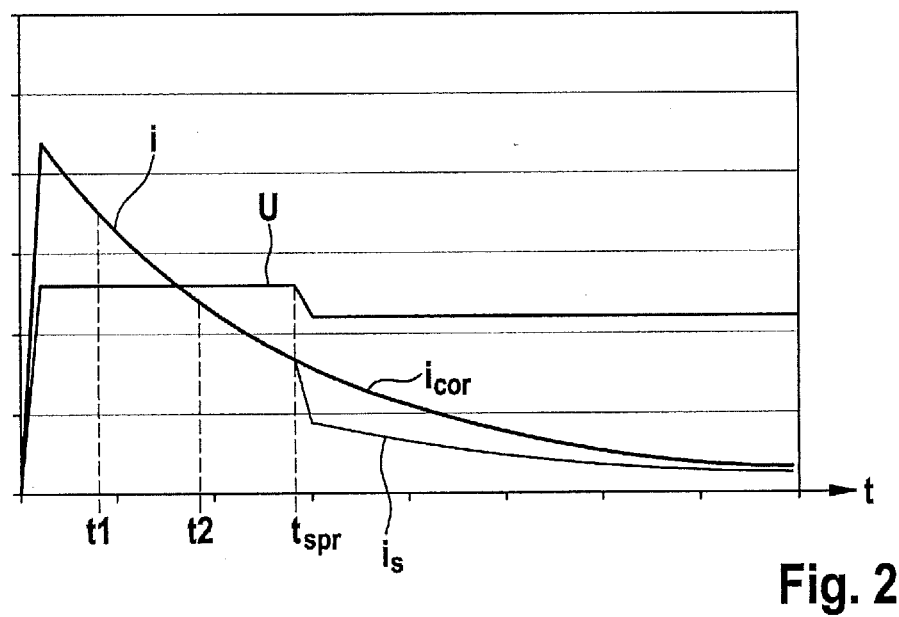
FIG. 2 shows a chart with the time-dependent curve of the current and the voltage after the brake motor has been switched on, the connecting of an additional consumer resulting in a drop in voltage and current.

FIG. 2 shows a chart with the time-dependent curve of current i and voltage U at the electric brake motor. Immediately after the electric brake motor is switched on, current i increases sharply initially and drops more slowly after reaching its peak, whereby the dropping branch of current curve i may be used to estimate motor resistance $R_M$ and motor constant $K_M$ of the electric brake motor. Motor parameters $R_M$ and $K_M$ are needed to ascertain the electromechanical clamping force applied by the electric brake motor. Motor voltage U supplied by the on-board power supply remains initially at a constant level.

At point in time $t_{spr}$ an additional electrical consumer which, like the electric brake motor, is connected in the on-board power supply, is connected, whereupon both voltage U and current i drop almost abruptly. The actual current curve is indicated by $i_s$ as opposed to the ideal current curve $i_{cor}$.

In order to deduce the ideal current curve $i_{cor}$ from the actual current curve $i_s$, on the basis of which the motor parameters are ascertained, a scaling factor $f_{cor}$ is ascertained based on the relationship between voltage jump $\Delta U$ and point in time $t_{spr}$ in voltage curve U. Voltage jump $\Delta U$ in this case is ascertained in the relationship between a voltage value $U_{t1}$ present before the jump minus a voltage constant $U_{const}$:

$$f_{cor}(t_{spr}) = \frac{\Delta U(t_{spr})}{U(t_1) - U_{const}},$$

voltage $U_{t1}$ being measured at point in time $t_1$, which is present before jump point in time $t_{spr}$.

With the scaling factor $f_{cor}$ ascertained in this way, the correction current $i_{cor}$, which corresponds to the ideal curve of the motor current with no additional consumer connected, is ascertained according to the following correlation:

$$i_{cor}(t_{spr}) = i_s(t_{spr}) + f_{cor}(t_{spr}) \cdot (i_{t1} - i_L)$$

In this case, $i_{cor}(t_{spr})$ refers to the corrected current after the jump at point in time $t_{spr}$, $i_s(t_{spr})$ refers to the actual current after the jump at point in time $t_{spr}$, $f_{cor}(t_{spr})$ refers to the scaling factor after the jump at point in time $t_{spr}$, $i_{t1}$ refers to the current value before the jump at point in time $t_1$ and $i_L$ refers to the idle current, which is captured load-free and stable after the switch-on surge current.

Advantageously, multiple current values $i_{cor}$ are calculated at other points in time $t_{spr+1}, t_{spr+2} \ldots t_{spr+n}$ after the jump, taking into account the scaling factor $f_{cor}$ based on current values i measured at points in time $t_2, t_3 \ldots t_{n+1}$ before the jump, and based on current values $i_s$ measured at points in time $t_{spr+1}, t_{spr+2} \ldots t_{spr+n}$ after the jump:

$$i_{cor}(t_{spr+1}) = i_s(i_{spr+1}) + f_{cor}(t_{spr}) \cdot (i_{t2} - i_L)$$
$$i_{cor}(t_{spr+2}) = i_s(t_{spr+2}) + f_{cor}(t_{spr}) \cdot (i_{s3} - i_L)$$
$$\vdots$$
$$i_{cor}(t_{spr+n}) = i_s(t_{spr+n}) + f_{cor}(t_{spr}) \cdot (i_{n+1} - i_L)$$

In this way, it is possible to ascertain via the correction of the current value the ideal current curve over the entire time range.

What is claimed is:

1. A regulating device for adjusting a clamping force exerted by a parking brake, the regulating device comprising:
   a control unit having a processor configured to perform the following:
      applying at least a portion of the clamping force by an electromotive brake device which includes an electric brake motor; and
      in the event of a jump in one of the voltage or current of the electric brake motor, ascertaining a corrected current compensating for the jump, wherein calculation of motor parameters of the brake motor for ascertaining the clamping force is based on the ascertained corrected current, wherein the corrected current is ascertained taking into account the product of a scaling factor and a current value present before the jump, and wherein multiple current values are calculated at multiple points in time after the jump, taking into account the scaling factor based on multiple current values present before the jump.

2. A method for adjusting a clamping force exerted by a parking brake, comprising:
   applying at least a portion of the clamping force by an electromotive brake device which includes an electric brake motor; and in the event of a jump in one of the voltage or current of the electric brake motor, ascertaining a corrected current compensating for the jump, wherein calculation of motor parameters of the brake motor for ascertaining the clamping force is based on the ascertained corrected current, wherein the corrected current is ascertained taking into account the product of a scaling factor and the difference between a current value present before the jump and an idle current present before the jump in accordance with the following formula:

$$i_{cor}(t_{spr}) = i_s(t_{spr}) + f_{cor}(t_{spr}) \cdot (i_{t1} - i_L)$$

where $i_{cor}(t_{spr})$ is the corrected current after the jump at point in time $t_{spr}$, $i_s(t_{spr})$ is the actual current after the jump at point in time $t_{spr}$, $f_{cor}(t_{spr})$ is the scaling factor after the jump at point in time $t_{spr}$, $i_{t1}$ is the current value before the jump, and $i_L$ is the idle current before the jump.

3. The method as recited in claim 2, wherein the scaling factor is ascertained from the relationship between the voltage jump and a voltage value present before the jump.

4. The method as recited in claim 2, wherein the corrected current is ascertained in the event of one of a voltage drop or a current drop.

5. The method as recited in claim 3, wherein the scaling factor $f_{cor}(t_{spr})$ is ascertained from the relationship between the voltage jump $\Delta U(t_{spr})$ and the difference between the voltage value $U(t_1)$ present before the jump and a constant $U_{const}$ in accordance with the following formula:

$$f_{cor}(t_{spr}) = \frac{\Delta U(t_{spr})}{U(t_1) - U_{const}}.$$

6. The method as recited in claim 4, wherein at least a portion of the clamping force is applied by an auxiliary brake device.

7. The method as recited in claim 5, wherein the constant $U_{const}$ is smaller than an operating voltage of the electric brake motor.

8. The method as recited in claim 5, wherein the constant $U_{const}$ is determined as the product of motor resistance $R_M$ and the idle current $i_L$:

$$U_{const} = R_M \cdot i_L.$$

9. The method as recited in claim 6, wherein a hydraulic vehicle brake is employed as the auxiliary brake device.

10. A method for adjusting a clamping force exerted by a parking brake, comprising:

applying at least a portion of the clamping force by an electromotive brake device which includes an electric brake motor; and in the event of a jump in one of the voltage or current of the electric brake motor, ascertaining a corrected current compensating for the jump, wherein calculation of motor parameters of the brake motor for ascertaining the clamping force is based on the ascertained corrected current, wherein the corrected current is ascertained taking into account the product of a scaling factor and a current value present before the jump, and wherein multiple current values are calculated at multiple points in time after the jump, taking into account the scaling factor based on multiple current values present before the jump.

* * * * *